(12) United States Patent
Hofmann

(10) Patent No.: US 6,318,339 B1
(45) Date of Patent: Nov. 20, 2001

(54) FUEL SUPPLY LINE SYSTEM

(75) Inventor: Karl Hofmann, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,776

(22) PCT Filed: Jun. 19, 1998

(86) PCT No.: PCT/DE98/01697

§ 371 Date: Aug. 3, 1999

§ 102(e) Date: Aug. 3, 1999

(87) PCT Pub. No.: WO99/28617

PCT Pub. Date: Jun. 10, 1999

(30) Foreign Application Priority Data

Dec. 3, 1997 (DE) .............................. 197 53 518

(51) Int. Cl.[7] .................................................. F02M 37/04
(52) U.S. Cl. ............................................ 123/469; 123/470
(58) Field of Search ................................. 123/469, 470, 123/468, 509

(56) References Cited

U.S. PATENT DOCUMENTS

| | | | |
|---|---|---|---|
| 2,897,800 | * | 8/1959 | Haas ........................ 123/470 |
| 3,845,748 | * | 11/1974 | Eisenberg .................. 123/468 |
| 4,445,713 | * | 5/1984 | Bruning ..................... 285/14 |
| 4,705,306 | * | 11/1987 | Guido et al. ................ 285/332 |
| 4,881,763 | * | 11/1989 | Guido et al. ................ 123/469 |
| 4,938,193 | * | 7/1990 | Raufeisen et al. .......... 123/470 |
| 6,135,091 | * | 10/2000 | Itoh et al. ................... 123/470 |

FOREIGN PATENT DOCUMENTS

| 4140668 | * | 7/1992 | (DE) . |
| 2266550 | * | 10/1975 | (FR) . |

* cited by examiner

Primary Examiner—Carl S. Miller
(74) Attorney, Agent, or Firm—Ronald E. Greigg

(57) ABSTRACT

A fuel supply line system for a fuel injection nozzle which is inserted into the cylinder head of an internal combustion engine, having a pressure connector that communicates tightly on the inlet side with the connection piece of an inlet tube and on the outlet side is pressed axially, via a sealing face, against a seat face on the nozzle holder body of the fuel injection nozzle by means of a screw connection. A shoulder is formed on the pressure connector, when the pressure connector is screwed into a threaded bore, in order to absorb the tightening moment, the shoulder is pressed against a contact pressure face embodied complimentary to the shoulder on the nozzle holder body and extending annularly all the way around, and that the sealing face is disposed on a body that is provided between the pressure connector and the nozzle holder body and is deformable in a defined way by the screwing in of the pressure connector.

1 Claim, 2 Drawing Sheets

FUEL SUPPLY LINE SYSTEM

The invention relates to a fuel supply line system for a fuel injection nozzle connected with the cylinder head of an internal combustion engine, having a pressure connector that communicates tightly on the inlet side with the connection piece of an inlet tube and on the outlet side is pressed axially, via a sealing face, against a seat face on the nozzle holder body of the fuel injection nozzle by means of a screw connection.

One such fuel supply line system is disclosed for instance in European Patent Disclosure EP 0 569 727 A1 and German Patent Disclosure DE 195 24 520 A1.

A problematic aspect of these fuel supply line systems is that the pressure connector, because it is screwed on, presses directly on the nozzle holder body with high contact pressure. As a result, especially at high line pressures on the order of magnitude of more than 1200 bar, cracks can occur in the nozzle holder body, because of the high stresses at the sealing face and the high internal pressures inside the fuel supply line.

These stresses are predominantly due to the high tightening moment with which the sealing face presses against the nozzle holder body.

An object of the invention is therefore to refine a fuel supply line system of this generic type in such a way that the high tightening moment of the pressure connector does not act on the sealing face and instead is maximally decoupled from the sealing face.

ADVANTAGES OF THE INVENTION

In a fuel supply line system of the type defined at the outset, this object is attained according to the invention in that a shoulder is formed on the pressure connector. When the pressure connector is screwed in, the shoulder in order to absorb the tightening moment, is pressed against a contact pressure face embodied complimentary to the shoulder on the nozzle holder body and extending annularly all the way around, and that the sealing face is disposed on a body that is provided between the pressure connector and the nozzle holder body and is deformable in a defined way by the screwing in of the pressure connector.

Because of the shoulder embodied on the pressure connector and the contact pressure face embodied on the nozzle holder body, the tightening moment with which the pressure connector is screwed into the nozzle holder body is to a certain extent "intercepted" in an especially advantageous way. The tight communication is established by the deformable body provided between the nozzle holder body and the pressure connector, and which body the sealing face is provided, and which, because of the aforementioned "interception" of the tightening moment by the shoulder on the pressure connector and by the contact pressure face on the nozzle holder body, is deformed with only a small portion of the forces generated by the screwing action when the pressure connector is screwed into the nozzle holder body.

In other words, as a result, the compressive forces that arise from the pressure connector to be screwed in with a high tightening torque are introduced not to the seat face of the nozzle holder body but rather to the annularly encompassing contact pressure face.

In terms of how the deformable body is embodied, purely in principle the most various embodiments are conceivable.

One highly advantageous embodiment provides that the deformable body is a molded part preferably comprising an easily deformable steel, which part, on a side toward the seat face, has the sealing face and on a side toward the pressure connector is embodied conically and has a sealing edge, which rests tightly against the inside of a conical recess of the pressure connector.

Such a body, because of its optimal deformability, especially in the axial direction, has especially good sealing properties.

In another embodiment it is provided that the deformable body is a sealing ring comprising an easily deformable material, such as steel. It may for instance be an O-ring. It is furthermore possible that it has a W-shaped form in section.

Both the O-ring design and the design that is W-shaped in section enable optimal sealing when an axial pressure caused by screwing the pressure connector in is exerted.

In yet another highly advantageous embodiment, it is provided that the deformable body is a ring, preferably comprising an easily deformable steel or soft iron, that is surrounded in form-locking fashion by a rubber-elastic sealing ring that engages an annularly encompassing recess embodied in the ring.

By means of this kind of deformable body, very good sealing is made possible, in particular even at relatively high tightening moments.

An object of the invention is furthermore attained by a fuel supply line system for a fuel injection nozzle inserted into the cylinder head of an internal combustion engine, having a pressure connector that penetrates a passage in the cylinder head and that communicates tightly on the inlet side with the connection piece of an inlet tube and on the outlet side is pressed axially, via a sealing face, against a seat face on the nozzle holder body of the fuel injection nozzle. A shoulder is formed on the pressure connector, when the pressure connector is screwed in, in order to absorb the tightening moment, the shoulder is pressed against a contact pressure face embodied complimentary to the shoulder on the nozzle holder body and extending annularly all the way around, and that a sealing lip that is deformable in a defined way is embodied integrally on the side of the pressure connector toward the nozzle holder body.

This fuel supply line system has the advantage in particular that a deformable body placed between the pressure connector and the nozzle holder body can be eliminated entirely, since a sealing lip that is deformable in a defined way is embodied integrally on the nozzle holder body itself.

With respect to the embodiment of the sealing lip, the most various embodiments are conceivable, purely in principle.

An especially advantageous embodiment in terms of deformability and the attendant sealing properties provides that the sealing lip, in section, has a swallowtail-like shape.

BRIEF DESCRIPTION OF THE DRAWINGS

Further advantages and characteristics of the invention are the subject of the ensuing description of several exemplary embodiments shown in the drawing.

Shown in the drawing are.

DETAILED DESCRIPTION

In order to deliver fuel to a fuel injection nozzle inserted into a cylinder head (not shown) of an internal combustion engine, a fuel supply line 11 is provided in a nozzle holder body 10; this line communicates with a fuel supply line 24 embodied in a pressure connector 20, which is screwed by means of a thread 22 into a threaded bore the nozzle holder body 10.

Figure 1:
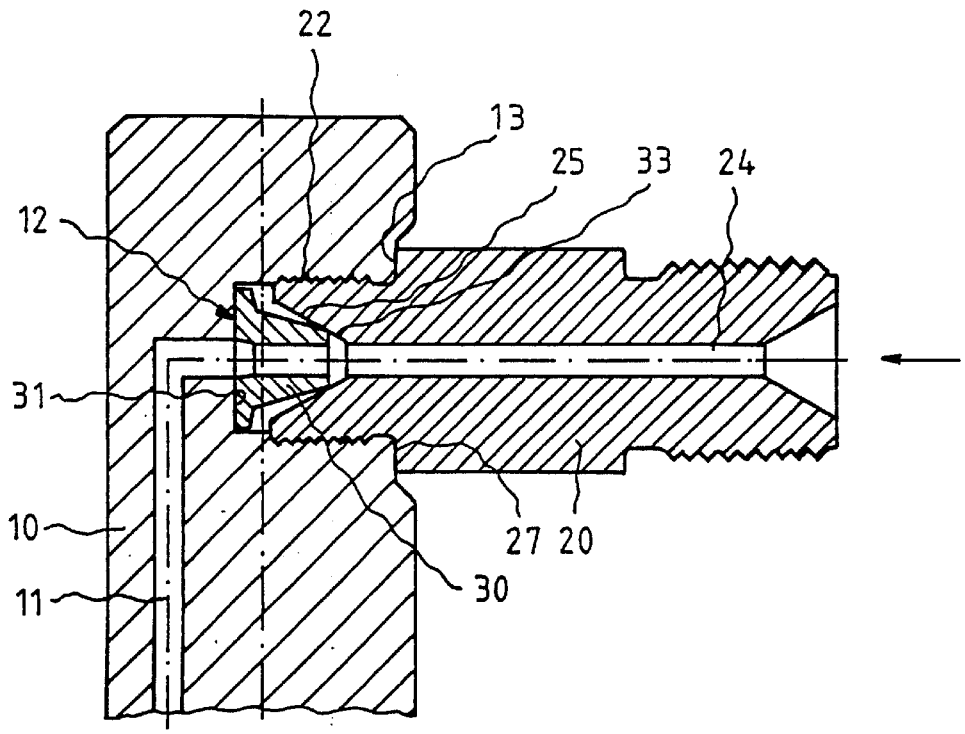
FIG. 1, partly in section, a fuel supply line system which makes use of the invention.
Figure 2:
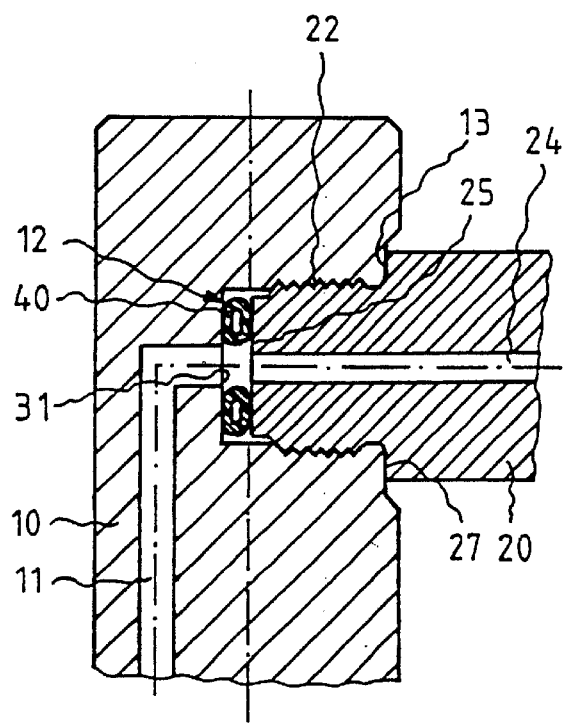
FIG. 2, partly cut away and in section, a further embodiment of a fuel supply line system that makes use of the invention.
Figure 3:
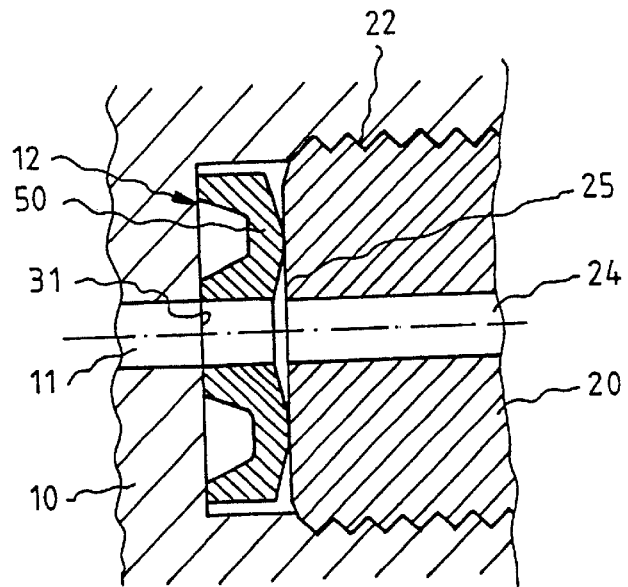
FIG. 3, another embodiment of a fuel supply line system that makes use of the invention.
Figure 4:
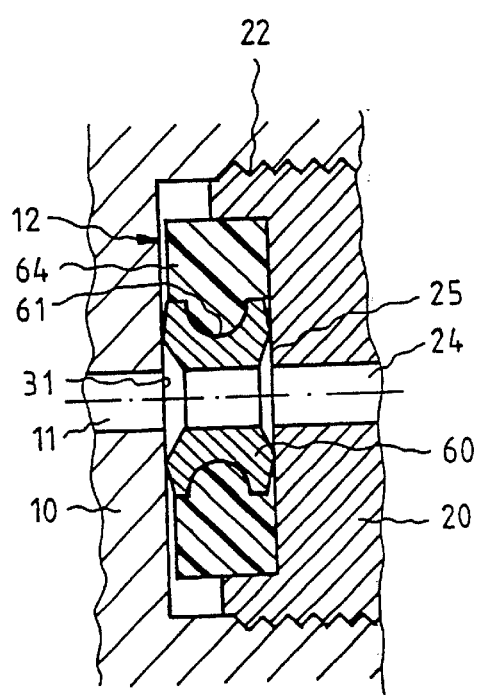
FIG. 4, partly cut away and in section, yet another embodiment of a fuel supply line system that makes use of the invention.

The pressure connector 20 communicates tightly on the inlet side with an inlet tube (not shown). On the outlet side, it is provided for instance with a conical recess (see FIG. 1) or a cylindrical recess (see FIG. 4), or as shown in FIG. 2, FIG. 3, and FIG. 4, with a substantially plane surface.

In a first exemplary embodiment, between the pressure connector 20 and a seat face 12 of a threaded bore of embodied on the nozzle holder body, a deformable body 30 is provided, which is a molded part comprising an easily deformable steel and which, on its side toward the seat face 12 on the nozzle holder body 10, has a sealing face 31 and, on its side toward the pressure connector 20, is embodied conically and has a sealing edge, which rests tightly on the conical recess embodied on the outlet side of the pressure connector 20.

The pressure connector 20 also has a shoulder 27, which when the pressure connector 20 is screwed in comes to rest on an annularly encompassing contact pressure face 13 formed on the nozzle holder body 10 and substantially entirely absorbs the tightening moment.

This shoulder 27 and the contact pressure face 13 in particular prevent a very high tightening moment from being exerted on the deformable body 30. Instead, the deformable body 30 is deformed by substantially lesser and primarily axially acting forces; as a result, because of its sealing edge 33 and its sealing face 31, a sealing communication is created between the nozzle holder body 10 and the pressure connector 20.

In further exemplary embodiments, shown in FIGS. 2, 3, 4 and 5, those elements that are identical to those of the first exemplary embodiment are provided with the same reference numerals, so that with respect to their description, reference may be made to the full contents of the description of the first exemplary embodiment.

In contrast to the first exemplary embodiment, however, in the further exemplary embodiment shown in FIG. 2, the deformable body is a sealing ring 40, which is disposed between the seat face 12 of the nozzle holder body 10 and a plane surface 26 disposed parallel to the seat face on the pressure connector 20.

This sealing ring 40, comprising an easily deformable steel, is deformed as shown in FIG. 2 as the pressure connector is screwed in.

The embodiment shown in FIG. 3 differs from that of FIG. 2 in that the sealing ring here is a metal ring, which comprises an easily deformable steel or soft iron and which in section has a substantially W-shaped cross-sectional design.

In the embodiment shown in FIG. 4, the deformable body includes a ring 60, preferably comprising an easily deformable steel, which is form-lockingly surrounded by a rubber-elastic sealing ring 64 that engages a recess embodied in the ring and annularly encompassing the recass. When the pressure connector 20 is screwed in, both the steel ring 60 and the rubber-elastic sealing ring 64 form-lockingly surrounding it are deformed.

Figure 5:
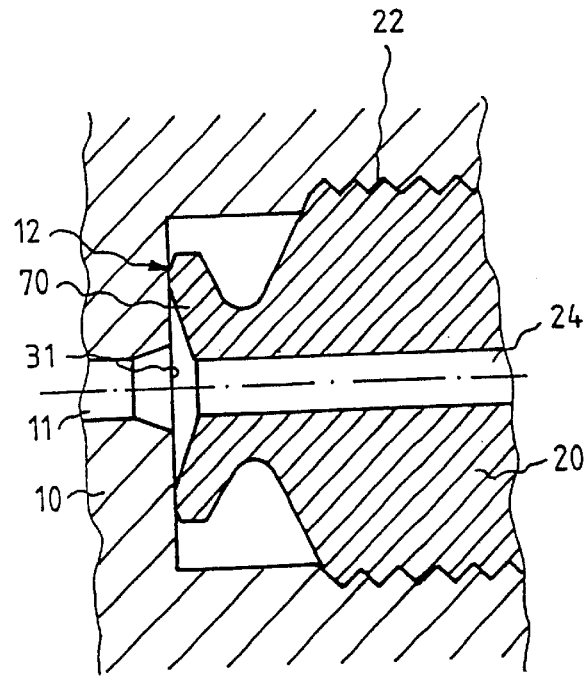
FIG. 5, partly cut away and in section, a further exemplary embodiment of a fuel supply line system that makes use of the invention.

In the embodiment shown in FIG. 5, a deformable body disposed between the pressure connector 20 and the nozzle holder body 10 is omitted entirely. Instead, on its side toward the seat face 12, the pressure connector 20 has a sealing lip 70 embodied integrally on it; in section, the sealing lip has a substantially swallowtail-like shape and it is deformed in a defined way when the pressure connector 20 is screwed in. Here again, the primary tightening moment is transferred— as already describe above—by the shoulder 27 embodied on the pressure connector to the contact pressure face 13 embodied on the nozzle holder body, while conversely only a small portion of the tightening moment is used to deform the sealing lip 70.

The foregoing relates to a preferred exemplary embodiements of the invention, it being understood that other variants and embodiments thereof are possible within the spirit ans scope of the invention, the latter being defined by the appended claims.

What is claimed is:

1. A fuel supply line system for a fuel injection nozzle for insertion into a cylinder head of an internal combustion engine, comprising a pressure connector (20) that communicates tightly on an inlet side with a connection piece of an inlet tube and that on an outlet side is pressed axially, via a sealing face, against a seat face (12) of a threaded bore of a nozzle holder body (10) of the fuel injection nozzle by means of a screw connection, a shoulder (27) is formed on the pressure connector (20), when the pressure connector (20) is screwed into said threaded bore, in order to absorb the tightening moment, said shoulder is pressed against a contact pressure face (13) embodied complimentary to the shoulder on the nozzle holder body (10) and extending annularly around the nozzle body, and that the sealing face is disposed on a deformable body (30) that is provided between the pressure connector (20) and the nozzle holder body (10) the deformable body is a molded part (30) comprising an easily deformable material, on a side toward the seat face (12), said deformable body has a sealing face (31) and on a side toward the pressure connector (20) said deformable body is embodied conically and has a sealing edge (33), said sealing edge rests tightly against an inside of a conical recess (25) of the pressure connector (20), and is deformable in a defined way by a screwing-in of the pressure connector (20).

* * * * *